(12) United States Patent
Cini et al.

(10) Patent No.: US 7,174,158 B2
(45) Date of Patent: Feb. 6, 2007

(54) PROCESS FOR TRANSMITTING SMS MESSAGES WITH PROTECTED IDENTITY

(75) Inventors: Marco Cini, Turin (IT); Boris Moltchanov, Turin (IT)

(73) Assignee: Telecom Italia S.p.A., Milan (IT)

( * ) Notice: Subject to any disclaimer, the term of this patent is extended or adjusted under 35 U.S.C. 154(b) by 385 days.

(21) Appl. No.: 10/474,446

(22) PCT Filed: Mar. 30, 2002

(86) PCT No.: PCT/EP02/03590

§ 371 (c)(1),
(2), (4) Date: Nov. 4, 2003

(87) PCT Pub. No.: WO02/082838

PCT Pub. Date: Oct. 17, 2002

(65) Prior Publication Data
US 2004/0106418 A1    Jun. 3, 2004

(30) Foreign Application Priority Data
Apr. 4, 2001   (IT) ............................ TO2001A0321

(51) Int. Cl.
H04M 1/66 (2006.01)
(52) U.S. Cl. ...................... 455/411; 455/466
(58) Field of Classification Search ............... 455/466, 455/411; 714/712, 821
See application file for complete search history.

(56) References Cited
U.S. PATENT DOCUMENTS

| | | | |
|---|---|---|---|
| 3,953,677 A | 4/1976 | Gannett | |
| 4,924,513 A | 5/1990 | Herbison | |
| 5,222,137 A | 6/1993 | Barrett | |
| 5,253,294 A | 10/1993 | Maurer | |
| 6,591,291 B1 * | 7/2003 | Gabber et al. | 709/206 |
| 6,597,917 B1 * | 7/2003 | Meuronen | 455/466 |

FOREIGN PATENT DOCUMENTS

| | | |
|---|---|---|
| DE | 196 38 072 | 3/1998 |
| DE | A1 196 38 072 | 3/1998 |
| EP | 0 899 918 | 3/1999 |
| EP | A2 0 899 918 | 3/1999 |
| WO | 98/12890 | 3/1998 |
| WO | WO 00/76231 | 12/2000 |
| WO | WO200076231 | * 12/2000 |
| WO | WO A1 00/76231 | 12/2000 |

* cited by examiner

Primary Examiner—Duc M. Nguyen
Assistant Examiner—Wayne Cai
(74) Attorney, Agent, or Firm—Andrew Wilford

(57) ABSTRACT

The procedure for transmitting SMS messages with protected identity prevents the recipient of an SMS message from seeing the caller's telephone number, and therefore the corresponding personal data, but allows him to contact the caller by sending an SMS message. During the procedure, the service manager ciphers the user's telephone number contained in the message header, and then subsequently deciphers it to restore the original telephone number.

5 Claims, 3 Drawing Sheets

PROCESS FOR TRANSMITTING SMS MESSAGES WITH PROTECTED IDENTITY

CROSS REFERENCE TO RELATED APPLICATIONS

This application is the U.S. national phase of PCT application PCT/EP02/03590, filed 30 Mar. 2002, published 17 Oct. 2001 as WO 02/082838, and claiming the priority of Italian patent application TO2001A000321 itself filed 4 Apr. 2001.

FIELD OF THE INVENTION

This invention relates to telephone network numerical transmission systems and in particular relates to a process for transmitting SMS messages with protected identity.

BACKGROUND OF THE INVENTION

As is known, modem telecommunications systems permit the transmission of short SMS type messages (Short Message System), which can be written with the telephone keypad and displayed on the telephone's display, at the same time as the voice signal without causing reciprocal interference. This alphanumeric transmission, which until recently was the prerogative of the radio network mobile telephone systems, is now possible using suitable equipment connected to the fixed network, such as telephones, fax machines, electronic post boxes (E-mail), etc.

The SMS messages are made up of different fields. In the header of the message, there is a field that contains the user's telephone number and is called the OADC field (Originator Address Destination Code), and in the body of the message, there are service and text fields. The user's telephone number permits the system manager to bill the call, and the recipient to identify the origin of the message. This feature, however, although necessary for the manager, may not be acceptable to the sender of the message or may, in fact, clash with the standards governing communication privacy, when for example the SMS messages are used for particular services, such as voting, prize-winning competitions, etc. The supplier of the final service must not be able to obtain the user's personal data via the telephone number, but must be able to reach the user by other means.

The methods currently employed to protect the identity of the caller using a voice telephone are not suitable for this purpose, as they normally work by making the last three figures of the telephone number illegible. This prevents user identification, but it also makes it impossible for the person receiving the call to call back.

Also known, from WO 2000/076231 of Ville Jarvinen, is a method for transmitting a message in a communications service operating through a mobile telephone network, permitting anonymous communications between system users. The telephone number of the sender of each message is replaced by the SMS center with a virtual ID, and such correspondence is stored in a database. The user who receives the message, without being aware of the real telephone number; is able to reply using the virtual ID, as the SMS center is able to associate the virtual ID to the correct number, consulting the database. This solution implies structural changes in the mobile network, for the implementation of the database and for its cooperation with the SMS center. Moreover the size of the database is not negligible and increases with the number of users.

Document EP 0 899 918 (equivalent U.S. Pat. No. 6,591, 291) discloses a system for generating an alias source address in a different technical field, i.e. for an electronic mail (e-mail) message. The system includes an alias source address substitutor that substitutes the alias source address for the real source address, using a secret key. This removes the real source address from the e-mail message and thereby renders the sender; located at the real source address, anonymous. Still, a reply e-mail can be sent by means of a remailer, e.g. by adoption of symmetric encryption algorithms. The procedure known from this document is, however; not transferrable to SMS messages, due to the specific structure of the SMS.

These difficulties are avoided and the aforesaid technical problems resolved by using the procedure for transmitting SMS messages with protected identity (the subject of this invention), which prevents the recipient of an SMS message from seeing the caller's telephone number, and therefore the corresponding personal data, but which allows him to contact the caller by sending an SMS message.

SUMMARY OF THE INVENTION

The subject of this invention is a procedure for transmitting SMS messages with protected identity wherein the sent SMS message is forwarded from the service center to transit equipment that ciphers with the transit equipment the user's telephone number by an application based on a ciphering algorithm into a ciphered telephone number having a first part containing the user's telephone number ciphered by the ciphering algorithm using a password selected from a plurality of different passwords and a second part containing an index identifying the selected password to its destination. The SMS message containing the ciphered telephone number is then transmitted to its destination where the identity of the user cannot be determined from the ciphered telephone number, but it is possible to reply using the ciphered number, due to the fact that the transit equipment can decipher the number and restore it to its original form, and then forward the call correctly.

BRIEF DESCRIPTION OF THE DRAWING

The foregoing and other characteristics of this invention will be made clearer by the following description of a preferred form of the invention, given by way of non-limiting example, and by the annexed drawings in which.

SPECIFIC DESCRIPTION

During the procedure for transmitting SMS messages with protected identity, the service manager ciphers the user's telephone number contained in the message header in order to prevent the user's personal data being revealed, and subsequently deciphers it to restore the original telephone number.

Figure 1:
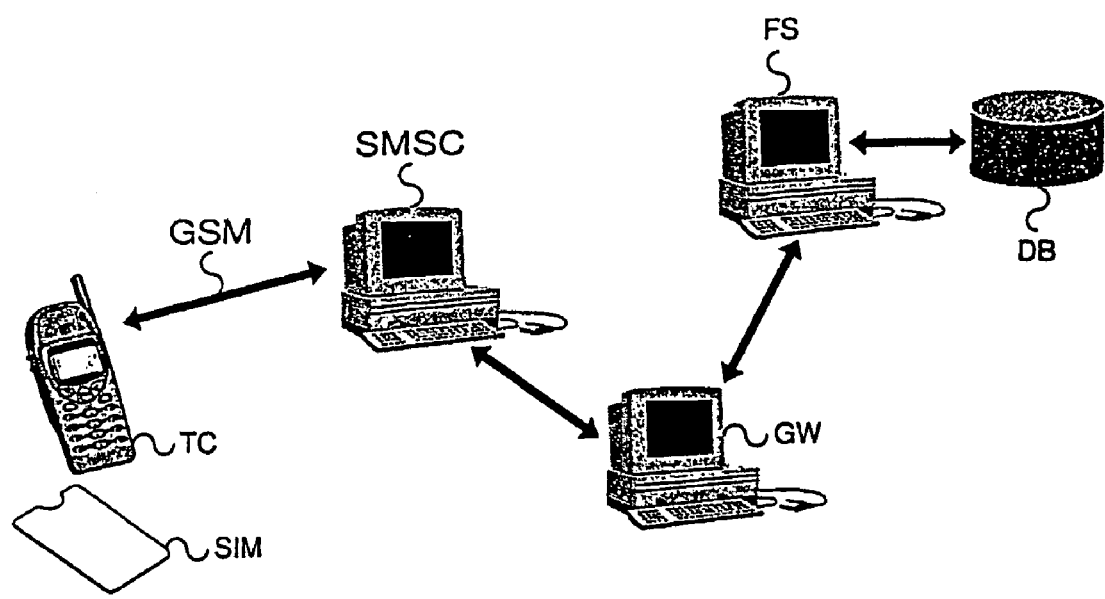
FIG. 1 represents a GSM type radio-mobile system in which the SMS messages are transmitted according to the invention.

FIG. 1 gives an example of a GSM radio-mobile system in which a TC cell phone with SIM card sends an SMS message with its telephone number displayed on the GSM network. The message is received and processed by the SMS message service center called SMSC (Short Message Service Center), and is then forwarded to the transit equipment, called GW, where the telephone number of the caller is ciphered. The GW equipment, also known as SMS Gateway, normally transforms the UDP messages (User Datagram Protocol) received from the SMSC into IP messages, which it then sends to the TCP/IP (Transmission Control Protocol/Internet Protocol) network via a TCP/IP router.

The modified message is then transmitted to its destination, which may be an FS services supplier that has a user database, DB, containing for example the user identification (ciphered number), the number of messages the user has sent, the sending dates, the information in the messages, etc.

If the FS services supplier cannot decipher the user's identity from the ciphered telephone number, it can still reply by using the ciphered number. The SMS GW will then decipher the number to restore it to its original form, and then forward the message. The services supplier obviously cannot access the SMS GW and consequently cannot see the telephone number.

The user's telephone number is ciphered by using a suitable application consisting of a special algorithm.

It may be a good idea to select a symmetrical, invertible algorithm with a single password for ciphering/deciphering, which acts on the serial number flow to cipher data of different lengths. "Stream" type algorithms, which can cipher the data as they arrive, byte by byte, till the end, satisfy these requirements.

For the algorithm to be applied correctly, the original telephone number, consisting of a decimal vector, must have the following characteristics:

contain the international code;
does not begin with zero;
does not exceed 14 decimal figures, code included.

The application outputs a vector of maximum 16 figures. This limit is established by the dimension of the OADC field of the SMS message. The output vector consists of an initial ciphered part of no more than the number of figures of the telephone number input, i.e. 14, and a second part of two figures consisting of the index of the password used for the ciphering.

A table of 33 passwords is created, in which each password corresponds to an index. The 99 possible indexes that can be expressed with the two decimal figures available are used to transmit further information, as described in further detail below.

The table of cipher passwords is not included in the source code, but is dynamically generated each time the cipher/decipher application is started in the SMS GW block. The 33 passwords remain the same, but cannot be deduced from the application source code or from the mathematical algorithm used to calculate them. The algorithm used can be easily changed.

In particular, the password can be randomly selected from the table or it can be the same for the same telephone number, according to the value that the manager, upon request by the service supplier, assigns to a "Historic" Boolean variable considered by the application.

If this "Historic" variable is "true", the service supplier can build up the story of the operations carried out by the mobile user, and stores it in an apparatus to which only the supplier can access. In this way, the service supplier can collect statistical data on the users and store the contents of individual messages, e.g. which user gave the correct answer in a prize-winning competition.

During the deciphering, the application inputs the vector with no more than 16 decimal figures, which contains the ciphered telephone number and the password index used for ciphering that occupies the last two vector positions.

The "true" "Historic" variable is not necessary for deciphering, because it can be deduced from the range of values to which the password index belongs.

In output, the application restores the original telephone number of no more than 14 decimal figures, without any zeroes at the beginning of the international code.

Figure 2:
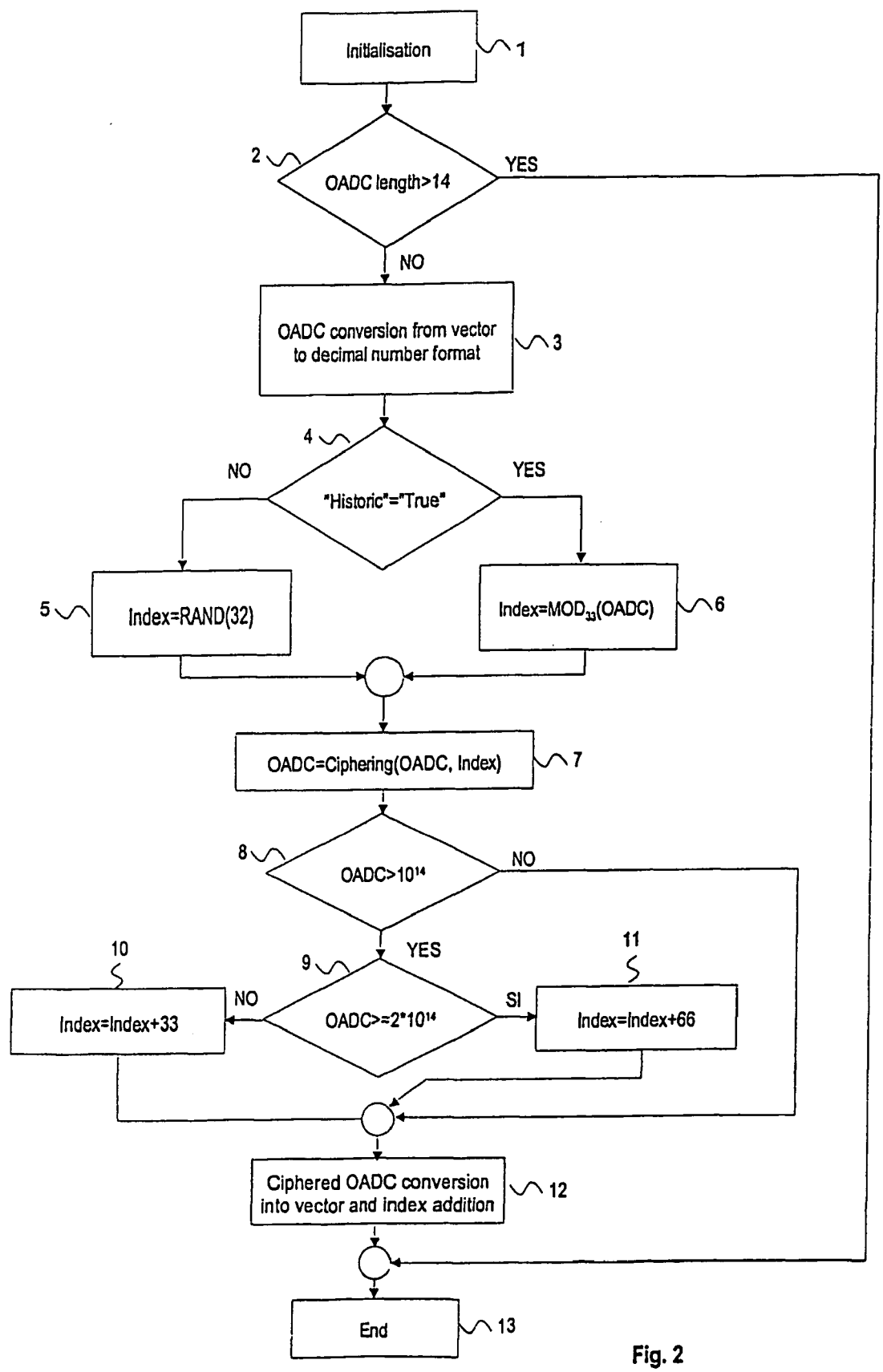
FIG. 2 is a flow diagram showing the ciphering operation.

Further details of the individual operations for ciphering the user's telephone number are given in the flow diagram shown in FIG. 2.

After the initial stage 1, in which the telephone number in the message header OADC field is acquired, a check is made to see how many bytes it is made of, stage 2. If it is more than 14 bytes long, it is sent directly to the output, stage 13, without performing any operations. Otherwise, the telephone number is converted from the format used for SMS transmission into a decimal number format, stage 3. SMS format, in fact, consists of a vector of 14 bytes, each one of which represents a number from 0 to 9 of the telephone number which must be converted into decimals so that it can be subjected to the subsequent operations.

The subsequent stage 4 checks whether the "Historic" Boolean variable has been set to "True". If this is not the case, i.e. the logic value is "False", a whole number less than 33 with the function called RAND (32) is randomly generated to obtain the password table index. Otherwise, the base 33 module operation is performed on the telephone number, with the $MOD_{33}$ (OADC) function, to give an index which will always be the same for the same number, stage 6. As is known, the base 33 module operation consists in dividing the number by 33 until a remainder of less than 33 is obtained. This remainder is the password table index.

In the subsequent stage 7, if the telephone number and the password table index, calculated in one of the two ways described previously, are available, ciphering can be performed by using the "stream" symmetrical algorithm selected.

Stage 8 consists in checking how may decimal figures make up the ciphered number. If it consists of no more than 14 decimal figures, it is reconverted from the decimal number into a byte vector, suitable for the SMS message transmission, and two index bytes are added to the end, stage 12, to be restored at the end of operations, stage 13. If, however, it consists of more than 14 decimal figures, it is checked whether it is more or less than $2*10^{14}$, stage 9. If it is less than $2*10^{14}$ the index is increased by 33, stage 10, whereas if it is greater than or equal to $2*10^{14}$, the index is increased by 66, stage 11.

In this way, the password table index may be in one of three ranges 0–32, 33–65, 66–99, and consequently provide the information that the ciphered number includes a $15^{th}$ figure in addition to the 14 decimal figures, which may be respectively 0, 1 or 2. Obviously, the indexes that differ from 00, 33 or 66 always identify the same password.

As in the previous case, the decimal number is reconverted into a byte vector that includes the two index bytes, thus obtaining a vector of 16 bytes, stage 12, which is then output, stage 13.

Figure 3:
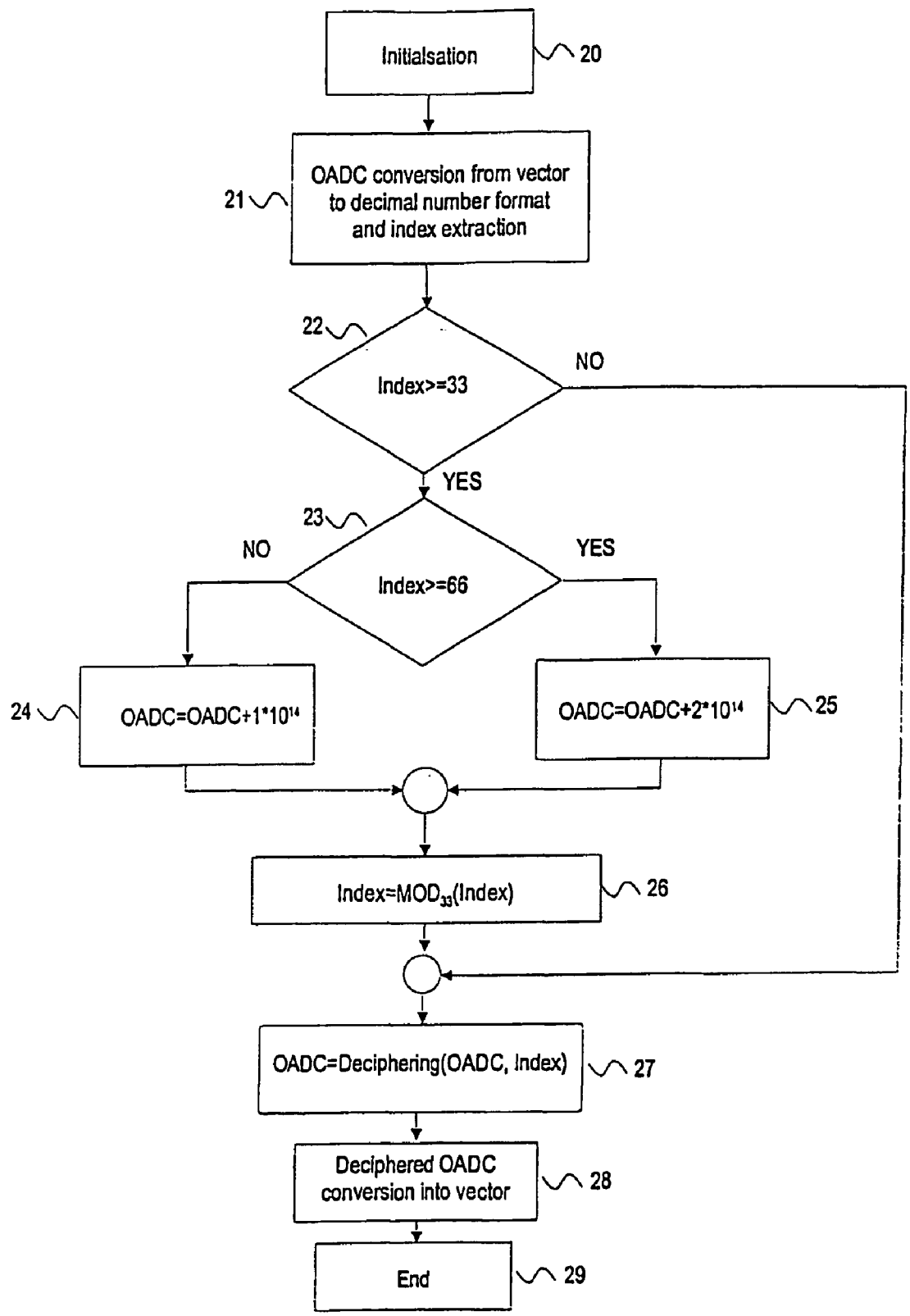
FIG. 3 is a flow diagram showing the deciphering operation.

Further details of the individual operations for deciphering the user's telephone number are given in the flow diagram shown in FIG. 3.

After an initial phase of initialization, stage 20, in which the ciphered telephone number in the message OADC field is acquired, it is converted from its vectorial format, used for SMS transmission, into a decimal number by extracting the last two figures that represent the password table index, stage 21.

Stage 22 then checks the index value. If the index is less than 33, the corresponding password can be found and the deciphering can be performed directly, stage 27. The number obtained is once again reconverted into a vector suitable for SMS message transmission, stage 28, and then output, stage 29.

If however, the index is greater or equal to 33, a check is made to see whether it is greater or equal to 66, stage 23. If it is, the ciphered telephone number is increased by $2*10^{14}$, stage 25, otherwise it is increased by $1*10^{14}$, stage 24, thus obtaining the original ciphered number In either case, the index is subjected to the base 33 module operation, stage 26, to obtain a value in the range 0–32, and is then deciphered, stage 27, reconverted into vectorial format, stage 28 and then completed, stage 29.

Obviously this description is given as a non-limiting example. Variants and modifications are possible, without emerging from the protection field of the claims.

The invention claimed is:

1. A process for the transmission of SMS messages with protected identity, the process comprising the steps of:
    sending the SMS message from a user with his telephone number visible in a header;
    receiving and processing the sent SMS message by a SMS message service center;
    forwarding the sent SMS message from the service center to transit equipment;
    ciphering with the transit equipment the user's telephone number by an application based on a ciphering algorithm into a ciphered telephone number having a first part containing the user's telephone number ciphered by the ciphering algorithm using a password selected from a plurality of different passwords and a second part containing an index identifying the selected password to its destination,
    transmitting the SMS message containing the ciphered telephone number to its destination where the identity of the user cannot be determined from the ciphered telephone number, but it is possible to reply using the ciphered number, due to the fact that the transit equipment can decipher the number and restore it to its original form, and then forward the call correctly.

2. The process as defined in claim 1 wherein the ciphering algorithm is a symmetrical, invertible algorithm with a single password for ciphering/deciphering, suitable for acting on a numerical serial flow for ciphering data of different lengths.

3. The process as defined in claim 1 wherein the step of ciphering comprises creating a table of passwords indexed by the index that is randomly generated or that is the same for the same telephone number, depending on the value assigned to a Boolean variable.

4. The process as defined in claim 1 wherein the ciphering algorithm performs a ciphering operation comprising:
    acquiring the visible telephone number;
    checking how many bytes the visible number consists of;
        if the number exceeds 14 bytes, sending it out directly without performing any operations;
        if the number does not exceed 14 bytes, converting it from the format used for SMS transmission into a decimal number format;
    evaluating the logic value of the Boolean variable;
        if the Boolean variable has a first logic value, randomly generating a whole number that is smaller than the number of passwords to obtain the index of the password;
        if the Boolean variable has a second logic value, performing a module operation on the telephone number using the number of passwords as base, obtaining an index for the password that will always be the same for the same telephone number;
    ciphering the telephone number using the password indexed by the index;
    checking how many decimal figures are in the ciphered number;
        if the number of decimal figures are not more than a first number, reconverting the ciphered number from the decimal number into a byte vector suitable for SMS message transmission;
        if the decimal figures are more than the first number, checking whether the ciphered number is greater than or equal to twice ten raised to the power of said first number;
            if the ciphered number is smaller than twice ten raised to the power of said first number, increasing the index of the password by the number of passwords;
            if the ciphered number is greater than or equal to twice ten raised to the power of said first number, increasing the index of the password twice by the number of passwords;
    reconverting the ciphered number from the decimal number into a byte vector including two index bytes; and
    ending the ciphering operation.

5. The process as defined in claim 4 wherein the deciphering operation comprises the steps of:
    acquiring the ciphered telephone number;
    converting it from the format used for SMS transmission into a decimal number format and extracting the last two figures that represent the password table index;
    checking the index value;
        if the index value is less than the password number, obtaining the corresponding password and carrying out the deciphering directly;
        if the index value is greater or equal to the number of passwords, deciding whether it is twice or more the number of passwords;
            if it is twice or more the number of passwords, increasing the ciphered telephone number by $2*10^{14}$;
            if it is less than twice the number of passwords, increasing the ciphered telephone number by $1*10^{14}$ to the first number;
    subjecting the index to the module operation using the number of passwords as the module base;
    performing the deciphering;
    reconverting the deciphered number into vectorial format; and
    ending the deciphering operation.

* * * * *